Patented Apr. 19, 1949

2,467,602

UNITED STATES PATENT OFFICE 2,467,602

2,3-BIS-(BENZAMIDOMETHYLTHIO)-PROPANOL

Frank K. Signaigo, Kenmore, N. Y., assignor, by mesne assignments, to the United States of America as represented by the Secretary of War No Drawing. Application June 13, 1946,
Serial No. 676,594

1 Claim. (Cl. 260—558)

This invention relates to organic sulfides and their preparation. For convenience and simplicity, they are referred to herein as S-ethers of certain compounds having mercapto groups.

This is a continuation-in-part of my copending application Serial No. 581,322, filed March 6, 1945, now U. S. Patent 2,449,332, for Compositions of matter.

It has recently been found that the compound 2,3-dimercapto-propanol is useful in arsenic therapy, particularly against such substances as the chlorovinylchloroarsines. The usefulness of this compound in aqueous media, however, is limited because of its relatively low water-solubility and because of the instability of the aqueous solutions.

An object of the present invention is to provide derivatives of 2,3-dimercaptopropanol which are useful as systemic anti-arsenicals and as anti-vesicants. Another object is to provide derivatives of 2,3-dimercaptopropanol which are more soluble in and more stable toward water than that compound. A more specific object is to prepare derivatives of 2,3-dimercaptopropanol in which mercapto hydrogen is replaced by radicals having aromatic hydrocarbon amide groups. Other objects will appear hereinafter.

These objects are accomplished by the invention of aromatic S-amidomethyl ethers of 2,3-dimercaptopropanol and the processes for preparing them which are described below. These S-ethers are derivatives of 2,3-dimercaptopropanol in which at least one of the mercapto hydrogens is replaced by the group

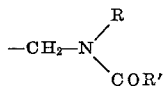

wherein R is hydrogen or a hydrocarbon radical and R' is an aromatic hydrocarbon radical.

In accordance with one method for preparing the aromatic S-amidomethyl ethers of this invention, an aromatic carboxylic acid amide having hydrogen on the amido nitrogen atom is reacted with formaldehyde and 2,3-dimercaptopropanol. This method is represented by the following equation:

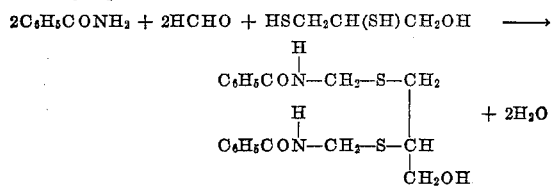

In a modification of the reaction illustrated above, an N-hydroxymethyl aromatic carboxamide is first prepared by reacting an aromatic carboxylic acid amide with formaldehyde, and the isolated N-hydroxymethyl aromatic amide then reacted with 2,3-dimercaptopropanol. This method is illustrated by the following equation:

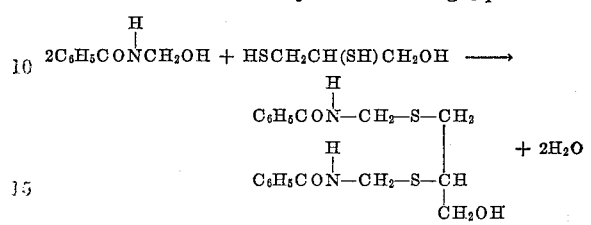

In accordance with still another method, which is convenient for the preparation of an anhydrous product, an N-(alkoxymethyl) aromatic carboxamide is reacted in the presence of an acid catalyst with 2,3-dimercaptopropanol. This method is illustrated by the following equation:

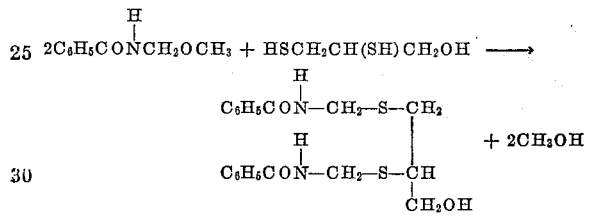

In each of these methods thio-ethers in which only one mercapto hydrogen is replaced by an aromatic amidomethyl radical can be obtained by employing equimolar proportions of the reactants.

The invention is illustrated in greater detail by the following example, in which the proportions of the ingredients are expressed as parts by weight:

Example

Seventy (70) parts of benzamide, 70 parts of water and 48 parts of 37% aqueous formaldehyde are mixed with 2 parts of potassium carbonate as a catalyst and the reaction mixture allowed to stand at room temperature. In a few minutes N-methylolbenzamide begins to crystallize out, a 90% yield of the product having a melting point 92–95° C. being obtained. A mixture of 60.4 parts of this material with 25 parts of 2,3-dimercaptopropanol in 82 parts of ethyl alcohol is warmed until a clear solution is formed. Into this solution is then passed sufficient dry hydrogen chloride to produce an acid reaction medium.

After standing at about 25° C. for about 15 hours, the mixture is warmed to 50–55° C. for thirty minutes and another 2.0 parts of N-methylolbenzamide added. After standing again for 15 hours at 25° C. it is then poured into 400 parts of ice water and extracted with 150 parts chloroform. The chloroform extract is dried with anhydrous calcium sulfate and the chloroform removed under reduced pressure. The residual material is the bis-S-(benzamidomethyl) ether of 2,3-dimercaptopropanol, having an analysis a nitrogen content of 6.9% as compared to the calculated amount of 7.2%.

So far as is known, any hydrocarbon primary or secondary aromatic carboxamide, i. e., one having amido hydrogen, may be employed in the processes stated and illustrated above for preparing the S-amidomethyl ethers of the present invention. Thus, by appropriate choice of the amide, ethers may be obtained in which the radical R of the group

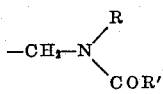

which is attached in the final products to one or both of the S-atoms of the 2,3-dimercaptopropanol, is hydrogen or aliphatic, alicyclic, or aromatic, long or short chain, or saturated or unsaturated, hydrocarbon radical and R' is aromatic hydrocarbon radical.

The S-amidomethyl ethers of 2,3-dimercaptopropanol need not be isolated from the reaction mixture for use in various applications, such as in therapeutic ointments, where they are employed in aqueous or water soluble compositions. However, if it is desired to remove the small amount of water introduced with the aqueous formaldehyde this can be done by warming the reaction mixture under reduced pressure.

In the process illustrated by the example, involving the reaction of N-methylolbenzamide with 2,3-dimercaptopropanol, an acid catalyst such as hydrogen chloride is used. In this process, it is also preferred to warm the reaction mixture, e. g., to from 50°–100° C. and to use an excess, e. g., 25%, of the amide in the reaction mixture.

The aromatic S-amidomethyl ethers of 2,3-dimercaptopropanol have a number of properties which make them of particular value for therapeutic applications. In comparison to 2,3-dimercaptopropanol, the S-amidomethyl ether group increases the solubility in water and protects the thiol group from decomposition, the compound still possessing the desired therapeutic and chemical reactivity. The aqueous solutions of the S-amidomethyl ethers can be adjusted to a pH ranging from mildly alkaline to mildly acid without destroying stability. The higher solubility of the S-amidomethyl ethers, compared to that of 2,3-dimercaptopropanol, enables the ethers to be incorporated in desired concentrations in water-soluble ointments for use in arsenic therapy. The S-amidomethyl ethers of 2,3-dimercaptopropanol are soluble in alcohols, e. g., methanol, ethanol, ethylene glycol and propylene glycol, but are insoluble in hydrocarbon solvents. The S-amidomethyl ethers having hydrogen or low molecular weight hydrocarbon radicals on the nitrogen atom are water soluble. The ethers having hydrocarbon radicals on the nitrogen atom are also soluble in ethyl ether.

Having thus described my invention, what I claim as new and wish to secure by Letters Patent is:

A stable, water soluble anti-vesicant compound useful as an anti-vesicant and in arsenic and cadmium therapy consisting of S-(benzamidomethyl) ether of 2,3-dimercaptopropanol.

FRANK K. SIGNAIGO.

REFERENCES CITED

The following references are of record in the file of this patent:

UNITED STATES PATENTS

| Number | Name | Date |
|---|---|---|
| 2,323,111 | Austin et al. | June 29, 1943 |
| 2,337,220 | Albrecht et al. | Dec. 21, 1943 |
| 2,432,797 | Peters et al. | Dec. 16, 1947 |